Aug. 9, 1938.  W. F. POTTS  2,126,573
RAKING APPARATUS
Filed Nov. 27, 1936
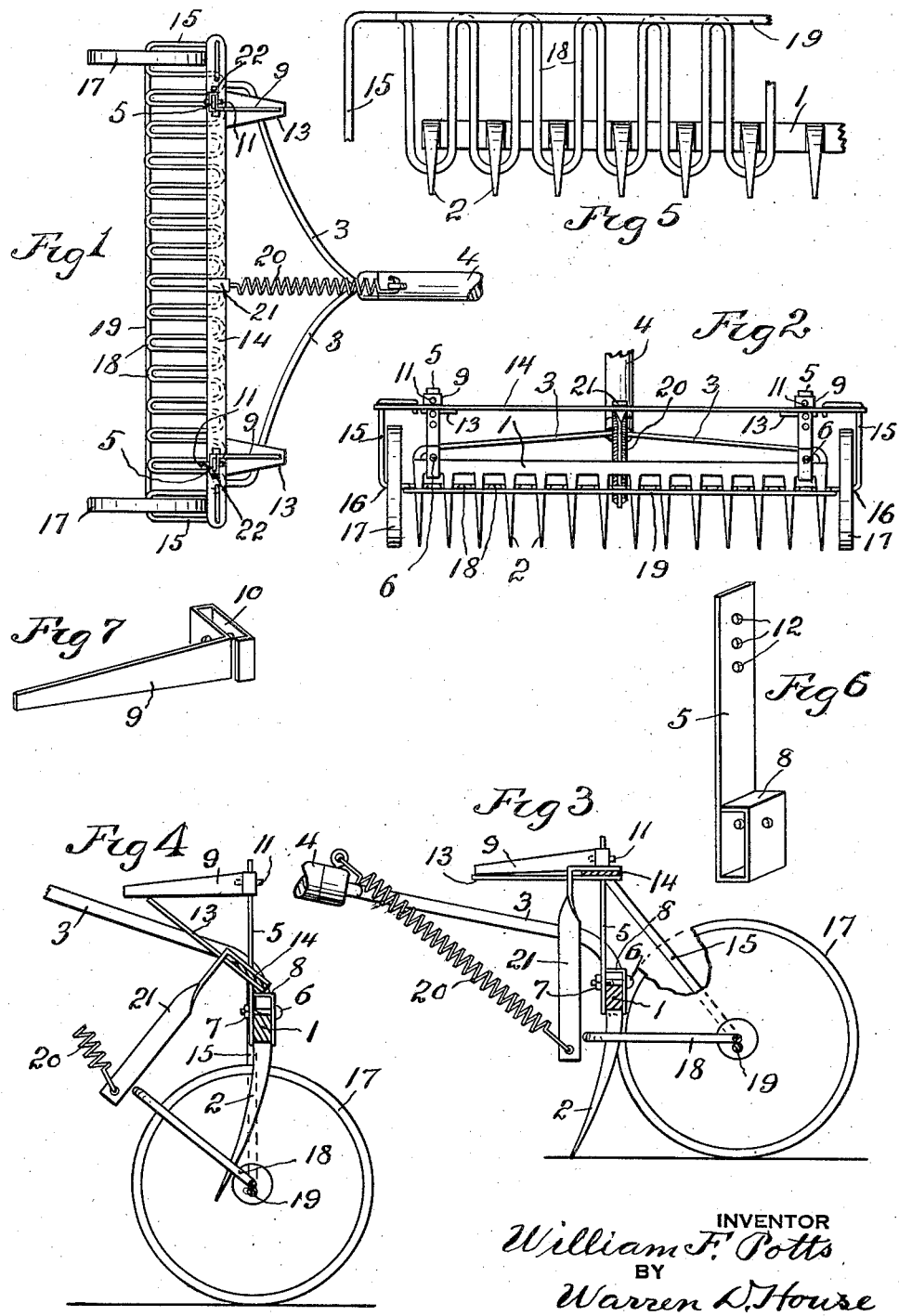
INVENTOR
William F. Potts
BY
Warren D. House
ATTORNEY Patented Aug. 9, 1938

2,126,573

UNITED STATES PATENT OFFICE 2,126,573

RAKING APPARATUS

William F. Potts, Kansas City, Mo.

Application November 27, 1936, Serial No. 112,920

11 Claims. (Cl. 55—146)

My invention relates to improvements in raking apparatus.

One of the objects of my invention is to provide novel means for supporting the head of the usual hand rake, which when the rake is drawn forwardly by its usual handle, the rake teeth will be in operative raking position, and when the handle is forced rearwardly, the rake head will be lifted, novel means being provided for stripping material, such as leaves or grass, from between the rake teeth, when the head is thus lifted.

Another object of my invention is the provision of novel means for automatically supporting the rake head in a raking position such that the teeth will not claw or hook into the ground or matted grass in the forward raking movement of the head.

A further object of my invention is the provision of a novel raking apparatus of the kind described, which is simple, cheap, strong, durable, not likely to get out of order, which is efficient in operation, and which can be rapidly operated with little effort by a child, as well as by a grown person.

The novel features of my invention are hereinafter fully described and claimed.

In the accompanying drawing, which illustrates the preferred embodiment of my invention, Fig. 1 is a reduced top view of my improved raking apparatus, partly broken away.

Fig. 2 is a reduced rear elevation of the raking apparatus, partly broken away, shown in the lower raking position of the rake teeth.

Fig. 3 is an enlarged vertical section, partly broken away, and parts left in side elevation, showing the rake head in the raking position.

Fig. 4 is a view similar to Fig. 3, showing the rake head when lifted by rearward forcing of the rake handle and the rearward movement of the carrying wheels is being resisted by grass or leaves.

Fig. 5 is an enlarged view, looking upwardly, of a portion of the rake head, and a portion of the stripping member.

Fig. 6 is an enlarged perspective view of one of the head supporting posts.

Fig. 7 is an enlarged perspective view of the vertically adjustable arm portion of one of the head supporting posts.

Similar characters of reference designate similar parts in the different views.

1 designates the usual head of an ordinary hand rake, 2 the teeth depending therefrom, 3 the end arms of the head which converge forwardly and are fastened in the usual manner to the rear end of the handle 4.

For lifting, supporting and limiting the range of vertical movement of the head 1, it has mounted on it respectively adjacent to its ends two posts, which are alike and each of which comprises a vertical body portion 5, Fig. 6, the lower end of which embraces opposite sides and the under side of the head 1, the sides engaging portions being connected above the head 1 by a bolt 6 passing through said portions and provided with a clamping nut 7, Figs. 4 and 3. The body 5 is provided with a forwardly extending portion 8, disposed above the bolt 6, and which serves as a stop for limiting the upward movement of the head 1, as will be hereinafter explained.

Each of said posts is provided with an arm portion 9, Fig. 7, which extends forwardly and rearwardly, and has at its rear end a loop portion 10 which embraces and is vertically slidably adjustable on the portion 5 to different positions in each of which it is releasably fastened by a removable pin 11, which extends transversely through the loop portion 10 and through any one of a vertical row of holes 12 provided through the body 5 adjacent to the upper end portion of the latter.

The arm portion 9 extends forwardly from the body 5, and is adapted to have its lower edge and front end portion bear upon and have pivotal supporting engagement with a forwardly extending arm portion 13 of supporting means comprising a horizontal transverse connecting member 14 adjacent to one end of the latter. Said connecting member 14 is provided adjacent to its other end with a similar arm portion 13, similarly disposed, and adapted to pivotally support the arm portion 9 of the other post 5.

Opposite end portions of the connecting member 14 are respectively fastened to and are adapted to swing with the outer ends of two radially disposed arms 15 of a transverse stripping member having horizontal alined portions 16 on which are respectively revoluble two supporting carrying wheels 17 constituting carrying means adapted to travel on the ground. The stripping member, which, as shown, is composed of wire, is provided between the portions 16 with stripping portions 18 disposed respectively between the rake teeth 2, which stripping portions comprise forwardly and rearwardly extending sinuous portions, disposed, when the rake is in the operative position shown in Fig. 3, closely adjacent to the under side of the rake head 1. When the rake head 1 is lifted, the sinuous stripping portions 18 strip collected material, such as leaves or grass from between the teeth 2.

To assist in the stripping operation, a transverse wire 19 is fastened to the rear end portions of the stripping portions 18.

For partially counterbalancing the weight of the head 1, means are provided which exerts a lifting effort thereon insufficient of itself, however, to lift the head from its lower raking position. As shown such lifting means comprises a coil spring 20, the forward end of which is attached to the handle 4 and the rear end to the lower end of a downwardly extending arm 21 of the connecting member 14.

The posts 5 respectively extend upwardly through slots 22, Fig. 1, in the connecting member 14, in which slots the posts 5 are vertically slidable and also are adapted, as hereinafter explained, for forward and rearward tilting.

In the normal operation of the apparatus, when the rake handle 4 is forced rearwardly, the apparatus will move rearwardly. The resistance of grass or leaves to the rearward movement of the wheels 17 will cause the rake through the posts 5 to swing the connecting member 14 and the arms 15 upwardly and rearwardly to the position shown in Fig. 4, from the raking position, shown in Fig. 3. Such upward and rearward movement of the connecting member 14, will tilt its arm portions 13 upwardly, thus lifting the arm portions 9 of the posts 5, and thereby lifting the rake head 1 with its teeth 2 clear of the ground, as shown in Fig. 4. The coil spring 20 will assist in such upward and rearward swinging of the connecting member 14 and the arms 15.

When the rake head 1 is thus lifted, the sinuous stripping portions 18 will strip the material which has been collected from between the teeth 2. This action takes place at the beginning of the rearward movement of the handle 4.

When the resistance of the grass and leaves to the rearward movement of the wheels 17 is insufficient to so swing the connecting member, the same result may be obtained by raising the forward end of the rake handle 4, and pushing rearwardly thereon. The posts 5, rake head 1 and handle 4 are rigidly fastened together, so that when the rake handle 4 is tilted upwardly by raising its forward end, the posts 5 will be rearwardly tilted, and by pushing rearwardly on the handle, the side arms 15 will be swung rearwardly, thereby swinging the connecting member 14 and with it the arm portions 13, whereby the latter will raise the arms 9, posts 5 and rake head 1, thus causing the stripping portions 17 to strip the raked material from between the teeth 2.

After the rear end of the back stroke has been reached, and the rake handle is pulled forwardly, the connecting member 14 with the arms 15 will be swung by the posts 5 forwardly and downwardly, thereby permitting the rake head 1 to drop at once, by gravity, to the initial raking position shown in Figs. 2 and 3.

The portion 8 of the body 5 of each post contacting with the adjacent arm portion 13 of the connecting member 14, limits the upward movement of the rake head 1, as shown in Fig. 4. The arm portions 9 of the posts 5, by striking the extensions 13, as in Fig. 3, limit the downward movement of the rake head.

By disposing the pins 11 in different holes 12 of the posts 5, the rake head may be adjusted vertically, so that the teeth 2 may be disposed against the ground or at different heights therefrom, as desired.

Thus by reciprocating the rake handle back and forth, the raking operation may be easily accomplished without danger of the rake teeth snagging in the ground.

By pressing downwardly on the rake handle, during its rearward movement, the tilting of the teeth to an upper position may be prevented, and the teeth may be employed to lift and straighten fallen grass, when this is desired.

Many modifications of my invention, within the scope of the appended claims, may be made without departing from the spirit of my invention.

What I claim is:

1. In a raking apparatus, the combination with a rake having a handle and a head provided with teeth, of carrying means adapted for travel on the ground, a transverse stripping member under said head pivoted on a horizontal transverse axis to said carrying means and having stripping portions respectively between said teeth relative to which said head is vertically movable, and having a radial arm extending upwardly and forwardly, a post extending upwardly from said head, and means connecting said post and arm by which said head, said stripping member and said carrying means are conjointly movable forwardly and backwardly, and by which when said handle forces said head rearwardly and sufficient resistance to backward movement is met by said carrying means said head will be lifted, whereby said portions will strip accumulated material from between said teeth, said means permitting said head to lower by gravity and to retract said arm when said handle is moved forwardly, said post limiting the vertical movement of said head relatively to said portions.

2. In a raking apparatus, the combination with a rake having a handle and a head provided with teeth, of carrying means adapted for travel on the ground, a transverse stripping member carried by said carrying means and having stripping portions respectively between said teeth relatively to which said head is vertically movable, said member having a radial arm, a post extending upwardly from said head, and means connecting said arm and said post by which said head, said member and said carrying means move forwardly and rearwardly conjointly, and by which, when said handle forces said head rearwardly and sufficient resistance to backward movement is met by said carrying means, said head will be lifted and said teeth will be moved upwardly between said stripping portions.

3. In a raking apparatus, the combination with a rake having a handle and a head having teeth, of carrying means adapted for travel on the ground, a transverse stripping member carried by said carrying means and having stripping portions respectively between said teeth relatively to which portions said head is vertically movable, said member having a radial arm, supporting means carried by said arm, and a post extending upwardly from said head and having means pivotally engaging said supporting means, whereby said head may be upwardly swung when rearward pressure is applied to said handle, and said carrying means meets sufficient resistance to rearward movement.

4. In a raking apparatus, the combination with a rake having a handle and a head having teeth, of carrying means adapted for travel on the ground, a transverse stripping member carried by said carrying means and having stripping portions respectively between said teeth relatively to which said head is vertically movable, said member having two parallel radial arms, connecting means between said arms, and two posts extending upwardly from said head vertically movable with respect to said connecting means and limited by the latter as to their vertical movement.

5. In a raking apparatus, the combination with a rake having a handle and a head having teeth, of carrying means adapted for travel on the ground, a transverse stripping member carried by said carrying means and having stripping portions respectively between said teeth relatively to which said portions said head is vertically movable, said member having two parallel radial arms, connecting means between said arms, and two posts extending upwardly from said head and having two forwardly extending extensions pivotally engaging said connecting means, whereby said head may be upwardly swung by rearward pressure applied to said handle when said carrying means meets with sufficient resistance to backward movement.

6. In a raking apparatus, the combination with a rake having a handle and a head having teeth, of carrying means adapted for travel on the ground, a transverse stripping member carried by said carrying means and having stripping portions respectively between said teeth relatively to which portions said head is vertically movable, said member having a radial arm, supporting means carried by said arm, a post extending upwardly from said head and having a portion pivotally engaging said supporting means, whereby said head may be upwardly swung when rearward pressure is applied to said handle and said carrying means meets with sufficient resistance to rearward movement, and a spring connecting said rake and said supporting means, and exerting a tension which tends normally, but of itself is insufficient, to lift said head relatively to said portions.

7. In a raking apparatus, the combination with a rake having a handle and a head having teeth, of carrying means adapted for travel on the ground, a transverse stripping member carried by said carrying means and having stripping portions respectively between said teeth relatively to which portions said head is vertically movable, said member having two radial arms extending upwardly and forwardly, supporting means connecting and movable with said arms, and a post extending upwardly from said head and having a portion vertically adjustable thereon to different positions and having pivotal engagement with said supporting means, whereby said head will be upwardly swung when rearward pressure is applied to said handle and said carrying means meets with sufficient resistance to its rearward movement.

8. In a raking apparatus, the combination with a rake having a handle and a head having teeth, of carrying means adapted for travel on the ground, a transverse stripping member carried by said carrying means and having stripping portions respectively between said teeth relatively to which stripping portions said head is vertically movable, said member having a radial arm, supporting means carried by said arm, and a post extending upwardly from said head and having a portion adjustable toward and from said head to different positions and having pivotal engagement means with said supporting means such that said head will be upwardly swung when rearward pressure is applied to said handle and said carrying means meets with sufficient resistance to rearward movement.

9. In a raking apparatus, the combination with a rake having a head provided with teeth and a handle extending forwardly from said head, of carrying means adapted for travel on the ground, a transverse stripping member having two radial arms extending in like directions, said member intermediate of said arms having forwardly and rearwardly extending sinuous stripping portions respectively between said teeth and relatively to which portions said head is vertically movable, supporting means connecting and movable with said arms, a post extending upwardly from said head and having a portion having pivotal engagement means with said supporting means such that said head will be upwardly swung when said handle is forced rearwardly and said carrying means meets with sufficient resistance to rearward movement, and means normally tending, but of itself insufficient, to swing said head upwardly relatively to said sinuous stripping portions.

10. In a raking apparatus, the combination with a rake having a handle and a head having teeth, of two carrying wheels adapted for travel on the ground, a transverse stripping member on which said wheels are revoluble having intermediate of said wheels stripping portions respectively between said teeth and relatively to which portions said head is vertically movable, said member having two radial arms extending in like directions, supporting means connecting and movable forwardly and rearwardly with said arms, a post extending upwardly from said head and having a portion having pivotal engagement means with said supporting means such that when said arms are rearwardly swung, said supporting means will be swung so as to lift said post and said head, and means connecting said rake and said supporting means normally tending, but of itself insufficient, to so swing said connecting member.

11. In a raking apparatus, the combination with a rake having a handle and a head having teeth, of two carrying wheels adapted for travel on the ground, a transverse stripping member on which said wheels are revoluble having intermediate of said wheels stripping portions respectively between said teeth and relatively to which portions said head is vertically movable, said member having two radial arms extending in a like direction, supporting means connecting said arms, and a post extending upwardly from said head and having pivotal engagement means with said supporting means such that said head may be swung thereon upwardly and downwardly.

WILLIAM F. POTTS.